March 16, 1926.

C. J. BASSLER

AIR RELIEF VALVE

Filed Jan. 2, 1925

1,576,709

INVENTOR
Carlos J. Bassler
BY
W.L. & C.L. Reynolds
ATTORNEYS

Patented Mar. 16, 1926.

1,576,709

UNITED STATES PATENT OFFICE.

CARLOS J. BASSLER, OF PORTLAND, OREGON, ASSIGNOR TO AMERICAN LIQUID METER COMPANY, OF PORTLAND, OREGON, A CORPORATION OF WASHINGTON.

AIR-RELIEF VALVE.

Application filed January 2, 1925. Serial No. 139.

*To all whom it may concern:*

Be it known that I, CARLOS J. BASSLER, a citizen of the United States of America, and resident of the city of Portland, in the county of Multnomah and State of Oregon, have invented certain new and useful Improvements in Air-Relief Valves, of which the following is a specification.

My invention comprises a valve adapted to be applied to pipe lines for the dual purpose of venting air accumulating at any given point in the pipe line, and of admitting air to the pipe line if for any reason the liquid therein tends to drop. Such tendencies may arise through sudden opening of a valve or if by reason of a leak the liquid runs rapidly from the pipe.

My invention is particularly intended to be applied to pipe lines leading from large containers of oil, gasoline, benzol and like liquids, which in general are of less specific gravity than water, and particularly to such liquids as are volatile and inflammable.

In similar valves for air relief, so far as I am aware, the valve has by a single movement moved practically to fully open position from its normal closed position, without any gradual starting or stopping, thus permitting a considerable quantity of air to pass in or out as the case requires. This is particularly objectionable when working with such liquids as those for which my valve is intended, for the sudden movements of starting and stopping of the column of liquid in a stand pipe will produce a sloppage and a rush of air laden with the gas of the volatile liquid, so that both the oil laden air and the liquid also at times are discharged through the relief valve. This creates a fire hazzard and is otherwise objectionable.

Floats employed to control such valves, if made heavy enough to withstand the pressures required, are too heavy and sluggish for the light oil, and the lighter floats have been found unable to withstand the pressures. It is my object, therefore, to provide a valve which will accommodate itself to all requirements of such relief valves, operating quickly when required, but which will start and stop gradually so that movement of the liquid is not checked or begun suddenly, but gradually brought to a position of rest or thrown into a condition of motion, thus preventing movement of the liquid except as the occasion may demand, and reducing the momentum of the liquid prior to stopping its movement.

It is a further object to provide such a valve and so to arrange the parts thereof that there is a chamber of considerable extent and positioned in such manner as to make it difficult for the liquid or for the fumes thereof to rise for ordinary fluctuations into the actual valve chamber, to be discharged to the atmosphere.

A further object is the provision of a valve which will accommodate itself by small movements to ordinary small fluctuations or surges of the level of the liquid in the pipe line, but which when the occasion demands may be opened rapidly to fully open position where the valve chamber is placed in free communication with the outside atmosphere.

My invention comprises those novel parts and combinations thereof which are shown in the accompanying drawings, described in the specification and particularly defined by the claims terminating the same.

In the accompanying drawings I have shown my invention in the form which is now preferred by me.

Figures 1, 2:
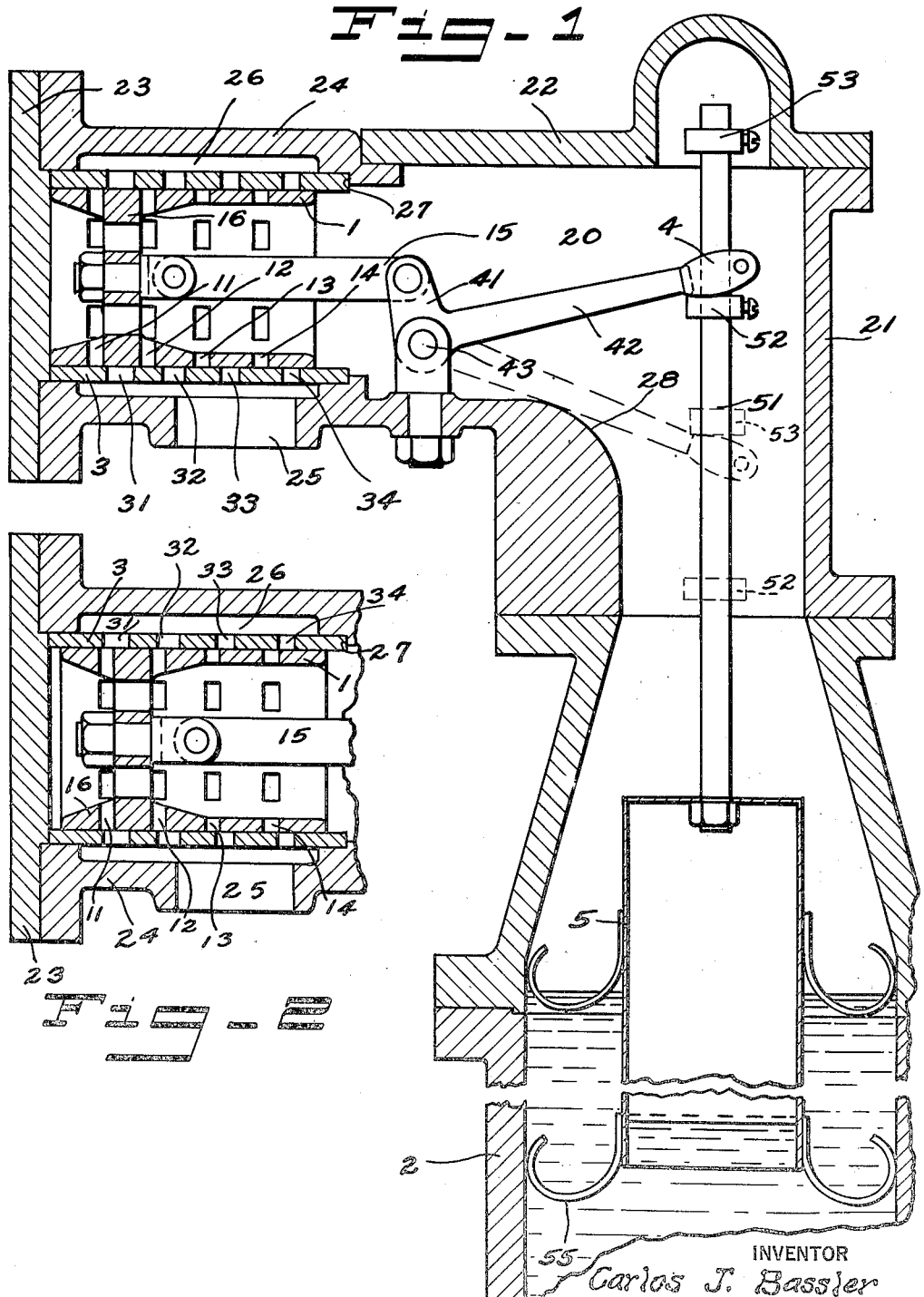
Figure 1 is an axial section through the valve, shown in closed position, its casing, and its control mechanism.
Figure 2 is a similar section through the valve and associated parts of the casing, alone, shown in partly open position.

Such valves, having venting chambers connected to pipe lines, are common in connection with water supply mains, and their operation is well understood and need not be described in detail. It is only sufficient to note that a standpipe 2 is connected at its lower end to the pipe line (not shown) and terminates at its upper end in a casing 21 enclosing a chamber 20, which chamber preferably is formed with a downward and a lateral extension, the downward extension being in free communication with the upper end of the stand pipe 2, and the lateral extension, being of such extent as may be required but of sufficient extent as to remove the va've 1, which is placed in one end thereof, well out of direct communication with the standpipe. Access to the chamber 20 may be had through a removable cap 22 and a head 23 which preferably is removably secured to close the end of the lateral extension 24 of the casing 21. A port 25 preferably in the lower side of the extension 24 and toward its outer end, affords communication between an annular passage 26 and the atmosphere.

Preferably a bushing 3 is positioned in the extension 24 between the annular passage 26 and the interior of the casing 21. This may be seated upon a shoulder 27 and is held in place by the head 23. Ports 31, 32, 33 and 34 are provided in the bushing 3, which cooperate with ports 11, 12, 13 and 14 in the valve 1, which is movable within the bushing 3.

The valve shown herein is a slidable sleeve valve, but any form of valve and bushing or casing for the same may be employed. Likewise any means of moving the valve in accordance with the level of the liquid in the standpipe 2 may be employed, but for reasons set forth heretofore and more fully explained hereafter, it is highly desirable that the float described hereafter be employed in valves intended for the purpose my valve is intended. I have shown a valve stem 15 as directly connected to a perforated web or spider 16 forming part of the valve, and have shown this stem 15 as operable through a connection with the short arm 41 of a bell crank lever pivoted at 43 within the chamber 20. Engagement of the long arm 42 of the bell crank lever with the ledge 28 of the casing 21 limits inward movement of the valve 1.

To control the movement of the valve 1 I employ a special float in the form of an inverted cup or bell 5 open at its lower end. Such a float may be light yet is unaffected by the pressure within the standpipe for the reason that the pressure inside and outside is always equal. This float is vertically movable in the standpipe 2 in accordance with the level of liquid therein, and its motion is communicated to the bifurcated head 4 of the bell crank lever 41, 42, through a stem 51 and collars 52 and 53 secured thereon and preferably adjustable lengthwise thereof. The float 5 may be suitably guided in the standpipe and preferably is positioned therein by flexible fingers 55 at its top and bottom. It will be noted that the open port 25 and the valve 1 controlling the same, may be removed from the level of liquid in the standpipe 2 by a distance corresponding to the length of the stems 51 and 15, and to some extent of the arm 42, and may, if desired, be placed far enough from the liquid to prevent the escape, with ordinary fluctuations, of air containing any considerable percentage of fumes arising from the liquid.

The ports 11 to 14 in the valve 1, and 31 to 34 in the bushing 3, cooperate in such manner that slight movement from the normal closed position, shown in Figure 1, will open by a single port, this to permit ordinary movements of the valve with slight fluctuations of the liquid level in the standpipe, and will close gently and without shock to the associated parts and before the liquid has acquired any considerable momentum. The arrangement is such, however, that when the occasion demands full opening of the valve, all of the parts may be brought into action with very slight movement of the valve. Four sets of ports are shown, but the number may be varied in accordance with the design and the action required of the valve. The port 31 is shown as longer in the direction of movement of the valve 1 than the adjacent port 32, and this in turn is longer than the port 33. The port 11 is normally positioned to be just closed, that is, just out of registry with the corresponding port 31, whereas the port 12 is considerably removed from a position of registry with its corresponding port 32. Slight movement of the valve 1 to the right will place the ports 11 and 31 into communication but will not afford communication between the ports 12 and 32. Slightly greater movement of the valve will afford communication between the ports 12 and 32, while not destroying but rather bettering the communication between the ports 11 and 31. The ports 13 and 33, however, are not yet in communication. This condition is illustrated in Figure 2. Thus each pair of cooperating ports in the valve and in the bushing are successively placed in communication, and the total area is successively increased as the valve 1 continues to move from normal closed position. The result is that the port opening is automatically and properly adjusted to the requirements of the air within the chamber 20, and the valve is gradually closed so that there is no shock to the mechanism, nor resulting water hammer, and movement occurs only as it is required.

This gradual movement of the valve in closing insures that the momentum of the liquid will be progressively checked so that as it rises it will never come to an abrupt stop, but will always be checked sufficiently prior to final halting of its movement that there is no rush either of liquid or air laden with fumes thereof, and there is thus no escape of either, provided the distance between the liquid level and the valve is made sufficient. It can be understood that to permit highly inflammable or explosive liquids to escape would create a condition which would be so objectionable as to prevent the use of such relief valves.

By properly spacing the collars 52 and 53, ordinary fluctuations which are due to causes other than variations in the actual pressure within the entire pipe line, and are due chiefly to local causes, do not affect the valve 1 to any considerable extent. The collar 53 above the bifurcated head 4 insures that the valve will be moved to open position if for any reason the float 5 drops from its normal position. The collar 52 assures that the valve will be held closed so long as the float is in its normal raised position.

Momentum of the liquid in the stand-pipe may be considerable if, when the valve is fully open, corresponding to the dotted line position of the parts in Fig. 1, its level rises suddenly to allow the collar 53 to rise to the full line position, especially as the float 5 and associated parts may move through the distance separating the collars 52 and 53. Serious "water hammer" might result, and the momentum might be great enough to permit the liquid to slop over through the valve ports, if the valve were only closed by a sudden movement at the end of the rise of the collar 52. By gradually closing the valve increasing resistance due to the air retained at the top of the stand-pipe, is equally applied to the entire surface of the liquid therein, and by such gradually increasing resistance the liquid's momentum is increasingly opposed, until it is brought to a stop by complete closure of the valve. Just prior to closing the last port the liquid's momentum is so low, due to the increasing resistance, that upon complete closure there is no tendency to overrun, or slop over.

The device has been found of great utility in discharging oil from large containers. A meter of the type shown in my Patent No. 1,505,306, and used in such an operation inevitably takes in a certain amount of air, until finally the line on the discharge side becomes air-bound. It becomes necessary then to wait until the air has risen from the oil and can be vented, or until the oil drains out from the line. By the use of this valve, which is very sensitive and which is operable even at low pressures, the air is vented as it accumulates, and no stopping is required. A saving of as much as one-third of the original amount of time, and consequent saving of ship's time when fueling a ship or loading a tanker, is thus obtainable by the use of this valve.

The employment of the type of float shown herein is likewise of importance for the reason that it is light enough to be sensitive and to be controlled by liquids of low specific gravity, yet is unaffected by pressures. It has been found that floats light enough to operate efficiently on the light oils will collapse when submitted to pressure and when heavy enough to stand pressure they will not operate efficiently on light oils, hence for the purpose for which this valve is intended the type of float employed is probably the only one which will operate satisfactorily.

What I claim as my invention is:

1. In an air relief valve, in combination, a valve casing having a series of ports therein, a tubular valve reciprocable therein and having a series of ports adapted to cooperate with the ports in the casing, said ports in each series being spaced from other ports in the same series in the direction of movement of the valve, and the several ports in the casing and valve being disposed and arranged relatively to bring the several corresponding ports, upon movement of the valve towards open position, into registry in succession, thereby to progressively increase the open port area, and float-controlled means for moving said valve.

2. In an air relief valve, in combination, a valve casing having a standpipe connection and having a series of ports laterally offset from said standpipe connection a valve movable in said casing and having a series of ports adapted to register with said ports therein, the ports in each series being spaced from other ports in the same series in the direction of movement of the valve, and the ports in the two series being disposed and shaped relatively to bring the several corresponding ports, upon movement of the valve towards closed position, out of registry in succession, thereby to progressively decrease the open port area, and float-controlled means operable through said standpipe connection for moving said valve.

3. In an air relief valve, in combination, a valve casing having a standpipe connection at its bottom, and having a series of ports laterally offset from said standpipe connection, a valve reciprocable in said casing and having a series of ports adapted to register with said ports therein, the corresponding ports in the two series being shaped and arranged relatively to progressively bring a decreasing number of ports into registry thereby to decrease the open port area, as the valve moves towards closed position, and float-controlled means operable through said standpipe connection for moving said valve.

4. In an air relief valve, in combination, a valve casing having a standpipe connection in its bottom, and having a series of ports laterally offset from said standpipe connection, a valve reciprocable therein and having a series of ports therein, said ports in the valve and casing being spaced axially of the valve, the ports in the series in one of said cooperating members being spaced farther apart than those in the series in the other member, and progressively decreasing in size, whereby the cooperating ports will successively come into registry to progressively increase the open port area, as the valve moves towards open position, and float-controlled means operable through said standpipe connection for moving said valve.

5. In an air relief valve, in combination, a valve casing having a standpipe at its bottom, and having a series of ports of progressively greater area, and positioned in a side chamber of said casing laterally offset from the standpipe connection, a valve movable in said side chamber and having a series of ports of equal area, each port in the valve corresponding to a port in the casing, and being spaced in the series less than the spacing of the ports in the casing, and float-controlled means operable through said standpipe connection for moving said valve.

6. In an air relief valve, in combination, a valve casing having a plurality of ports therein, a valve movable therein and having a plurality of ports adapted to cooperate with the ports in the casing, said ports in the casing and valve being disposed and arranged relatively to bring the several corresponding ports, upon movement of the valve towards open position, into registry in succession, thereby to progressively increase the open port area, and float-controlled means for moving said valve including a connection permitting movement of the float substantially between upper and lower limits without corresponding movement of the valve.

7. In an air relief valve, in combination, a valve casing having a plurality of ports therein, a valve movable therein and having a plurality of ports adapted to cooperate with the ports in the casing, said ports in the casing and valve being disposed and arranged relatively to bring the several corresponding ports, upon movement of the valve towards open position, into registry in succession, thereby to progressively increase the open port area, and float-controlled means for moving said valve, including a stem movable with the float, a pair of collars adjustable along and spaced upon said stem, and means connected to said valve and engageable by said collars towards the ends of the float's movement to operate the valve.

8. In an air relief valve, in combination with a stand-pipe, a valve casing having a downward connection to said stand-pipe and a lateral extension, and having a port in said lateral extension spaced from said downward extension, a valve in said lateral extension controlling said port, the ports of said valve and said port in the casing being relatively disposed and arranged to progressively decrease the momentum of liquids rising in the stand-pipe, and float-controlled means for regulating said valve in accordance with the level of liquid in the stand-pipe.

Signed at Portland, Multnomah County, Oregon, this 17th day of November, 1924.

CARLOS J. BASSLER.